(12) United States Patent
Chang (10) Patent No.: US 11,992,975 B2
(45) Date of Patent: May 28, 2024

(54) RAPID MOLD REPLACING DEVICE FOR USE IN MOLDING MACHINE

(71) Applicant: Tsai-Shun Chang, New Taipei (TW)

(72) Inventor: Tsai-Shun Chang, New Taipei (TW)

( * ) Notice: Subject to any disclaimer, the term of this patent is extended or adjusted under 35 U.S.C. 154(b) by 443 days.

(21) Appl. No.: 17/504,907

(22) Filed: Oct. 19, 2021

(65) Prior Publication Data

US 2022/0126485 A1   Apr. 28, 2022

(30) Foreign Application Priority Data

Oct. 28, 2020   (TW) .................................. 109137469

(51) Int. Cl.
*B29C 33/00*   (2006.01)
*B29C 33/30*   (2006.01)
*B29C 45/00*   (2006.01)
*B29C 45/17*   (2006.01)
(Continued)

(52) U.S. Cl.
CPC ........ *B29C 33/305* (2013.01); *B29C 45/1742* (2013.01); *B29C 45/1756* (2013.01); *B29C 49/48* (2013.01); *B29C 2045/1757* (2013.01); *B29C 2045/1785* (2013.01); *B29C 2049/4856* (2013.01)

(58) Field of Classification Search
CPC .. B29C 2045/1757; B29C 49/06; B29C 49/48
See application file for complete search history.

(56) References Cited

U.S. PATENT DOCUMENTS

| | | | | |
|---|---|---|---|---|
| 4,457,689 A | * | 7/1984 | Aoki | B29C 49/062 |
| | | | | 425/525 |
| 5,551,862 A | * | 9/1996 | Allred, Jr. | B29C 49/56 |
| | | | | 264/543 |

(Continued)

FOREIGN PATENT DOCUMENTS

| | | | | |
|---|---|---|---|---|
| CN | 114434692 | * | 11/2020 | |
| JP | H-06335959 | * | 12/1994 | B29C 2049/4892 |

(Continued)

OTHER PUBLICATIONS

CN-114434692 (Zaishun) Nov. 2020 (online machine translation), [Retrieved on Jan. 18, 2024]. Retrieved from: Espacenet (Year: 2020).*

(Continued)

*Primary Examiner* — Seyed Masoud Malekzadeh
*Assistant Examiner* — Andrés E. Behrens, Jr.
(74) *Attorney, Agent, or Firm* — Guice Patents PLLC (57) ABSTRACT

A rapid mold replacing device for use in molding machine includes: a mold having lateral walls at two ends disposed with a pair of bolt slots; a pair of fastening members, having a locking member connected at an outer side of each fastening member, and protruded with a locking bolt, and a top surface of each locking member having an unlocking slot; and an unlocking mechanism, disposed on a top surface of the elevation seat and having at least one first retractable driving device, and a pair of unlocking blades capable of being synchronously driven by the first retractable driving device; when the pair of unlocking blades are inserted in or released from the pair of unlocking slots, the mold can be formed in an un locked or a locked status to the mold.

9 Claims, 7 Drawing Sheets

(51) Int. Cl.
    *B29C 49/00*         (2006.01)
    *B29C 49/48*         (2006.01)

(56)                 References Cited

U.S. PATENT DOCUMENTS

| | | | | |
|---|---|---|---|---|
| 5,840,349 A | * | 11/1998 | Brown, Jr. | B29C 49/56 |
| | | | | 425/453 |
| 2009/0297654 A1 | * | 12/2009 | Chang | B29C 49/061 |
| | | | | 425/524 |
| 2012/0294974 A1 | * | 11/2012 | Yokobayashi | B29C 33/30 |
| | | | | 425/541 |
| 2019/0009435 A1 | * | 1/2019 | Chang | B29C 45/1742 |
| 2022/0219373 A1 | * | 7/2022 | Coran | B29C 49/56 |

FOREIGN PATENT DOCUMENTS

| | | | | | |
|---|---|---|---|---|---|
| JP | H-08244103 | * | 9/1996 | | B29C 49/06 |
| JP | 2019059244 | * | 4/2019 | | B29C 49/06 |

OTHER PUBLICATIONS

JP-2019059244 (Hiroshi) Apr. 2019 (online machine translation), [Retrieved on Jan. 18, 2024]. Retrieved from: Espacenet (Year: 2019).*

JPH-08244103 (Koichi) Sep. 1996 (online machine translation), [Retrieved on Jan. 18, 2024]. Retrieved from: Espacenet (Year: 1996).*

JPH-06335959 (Yoshiki) Jun. 1994 (online machine translation), [Retrieved on Jan. 18, 2024]. Retrieved from: Espacenet (Year: 1994).*

\* cited by examiner

RAPID MOLD REPLACING DEVICE FOR USE IN MOLDING MACHINE

BACKGROUND OF THE INVENTION

Field of the Invention

The present invention relates to a rapid mold replacing device, especially to a rapid mold replacing device for use in molding machine, for example an injection molding machine or an injection bottle blowing machine.

Description of the Related Art

A molding machine, for example an injection molding machine or an injection bottle blowing machine is a must-have equipment for manufacturing plastic products. The above-mentioned molding machine is to utilize a mold for manufacturing the plastic products, thus different molds are required for replacements if different types of plastic products are desired to be manufactured.

Take a bottle preform holding mold of a conventional injection bottle blowing machine as an example, the injection bottle blowing machine includes a machine table and a rotary plate disposed on a bottom surface of an elevation seat, there are at least three operating zones defined on the machine table and the elevation seat, for example an injecting zone, a bottle blowing zone and a pushing zone. A bottom surface of the rotary plate is respectively disposed with a mold clamping mechanism at a location corresponding to each of the operating zones.

Each of the mold clamping mechanisms has a pair of positioning pins spaced with an interval and disposed on the bottom surface of the rotary plate; a bottle preform holding mold formed through a first half mold and a second half mold being engaged, two sides of the bottle preform holding mold have a pair of pin holes allowing the pair of positioning pins to be disposed and positioned and formed through the first half mold and the second half mold being engaged; and a pair of fastening members locked on the bottom surface of the rotary plate, bottom ends of the pair of fastening members are inwardly protruded with a pair of supporting sheets arranged to face each other and allowing two sides of the bottle preform holding mold to be crossly arranged and positioned, and bottom surfaces of the pair of positioning pins are abutted against each of the corresponding supporting sheets. As such, at least three sets of the mold clamping mechanisms are disposed on the bottom surface of the rotary plate.

When a bottle preform holding mold having a different diameter is desired to be used for replacement, at least one operator holds a bottle preform holding mold having a first diameter, and another operator detaches the pair of fastening members, so that the bottle preform holding mold having the first diameter can be removed; then a bottle preform holding mold having a second diameter and the pair of positioning pins are sleeved so as to be positioned, the pair of fastening members and the rotary plate are locked for enabling the bottle preform holding mold having the second diameter to be crossly arranged and fastened on the pair of fastening members.

In view of the above-mentioned mold replacing operation, the pair of fastening members at each of the operating zones requires a detaching and locking process for replacing a new bottle preform holding mold, and there are at least two operators required for the mold replacing operation, so that the labor and the working hour are unnecessarily wasted; accordingly, the aforesaid disadvantage shall be improved.

SUMMARY OF THE INVENTION

One primary objective of the present invention is to provide a rapid mold replacing device for use in molding machine, in which the rapid mold replacing device is disposed at an operating zone, for example a pushing zone, so that a loaded mold, for example a bottle preform holding mold, can be rapidly locked or unlocked, and there is no connection member, for example a screw, required for being connected or disconnected, thereby achieving an effect of saving labor and working time.

For achieving said objective, one technical solution provided by the present invention is to provide a rapid mold replacing device for use in molding machine, disposed on a molding machine, the molding machine includes a machine table, an elevation seat, and a rotary plate disposed at a bottom end of the elevation seat and capable of being synchronously elevated therewith, and at least two operating zones are defined on the machine table and the elevation seat; wherein, the rapid mold replacing device includes: a mold arranged corresponding to each of the operating zones, and having lateral walls defined at two ends thereof disposed with a pair of bolt slots; a pair of fastening members, disposed on a bottom surface of the rotary plate, protruded with a pair of supporting sheets allowing the mold to be crossly arranged and positioned; a locking member connected at an outer side of each of the fastening members, and protruded with a locking bolt arranged towards the corresponding bolt slot and passing the adjacent fastening member, and a top surface of each of the locking members additionally has an unlocking slot; and each of the locking members has an elastic displacing mechanism arranged towards the corresponding fastening member; and an unlocking mechanism, disposed on a top surface of the elevation seat and corresponding to one of the operating zones, wherein the unlocking mechanism has at least one first retractable driving device, and a pair of unlocking blades, arranged corresponding to the pair of unlocking slots and capable of being synchronously driven by the first retractable driving device to pass the elevation seat and the rotary plate; when the pair of unlocking blades are inserted in the pair of unlocking slots, the pair of locking members form a horizontal displacement at the outer side of the fastening member through an elastic effect provided by the elastic displacing mechanism, so that each of the locking bolts is released from the corresponding bolt slot, thereby forming an unlocked status to the mold; when the pair of unlocking blades are released from the pair of unlocking slots, the pair of locking members form another horizontal displacement at the outer side of the fastening member through the elastic effect provided by the elastic displacing mechanism, so that each of the locking bolts is inserted in the corresponding bolt slot, thereby forming a locked status to the mold.

According to one embodiment of the present invention, the molding machine is a vertical injection bottle blowing machine, the operating zones include an injecting zone arranged on the machine table and allowing an injection mold to be disposed, a bottle blowing zone allowing a bottle blowing mold to be disposed, and a pushing zone arranged on the elevation seat and allowing a pushing mechanism to be disposed.

According to one embodiment of the present invention, the molding machine is a vertical injection molding machine, the operating zones include an injecting zone arranged on the machine table and allowing an injection mold to be disposed, and a pushing zone arranged on the elevation seat and allowing a pushing mechanism to be disposed.

According to one embodiment of the present invention, the unlocking mechanism is disposed at the pushing zone arranged on the top surface of the elevation seat.

According to one embodiment of the present invention, the mold is a bottle preform holding mold.

According to one embodiment of the present invention, the bottle preform holding mold has a first half mold and a second half mold; at least one connection rod horizontally penetrating a stepped penetrating hole correspondingly formed in the first half mold and the second half mold, a retractable spring respectively disposed at two sides of the connection rod and sleeved in each of the penetrating holes, a sealing member respectively disposed at two ends thereof; and a pair of top connecting slots formed at two sides of the bottle preform holding mold, vertically arranged and spaced with an interval, formed through the first half mold and the second half mold being engaged and formed in an inwardly inclined status, wherein the pair of bolt slots are disposed on lateral walls defined at two ends of the bottle preform holding mold and formed through the first half mold and the second half mold being engaged According to one embodiment of the present invention, each of the fastening members is horizontally formed with a through slot at a location allowing the locking bolt to pass.

According to one another embodiment of the present invention, the elastic displacing mechanism has a stepped seat hole horizontally formed and adjacent to at least one side of the locking member of each of the fastening members, and a pair of fixing members each passing through an elastic member disposed in one of the stepped seat hole to be fixed with one of the fastening member.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

Figure 1:
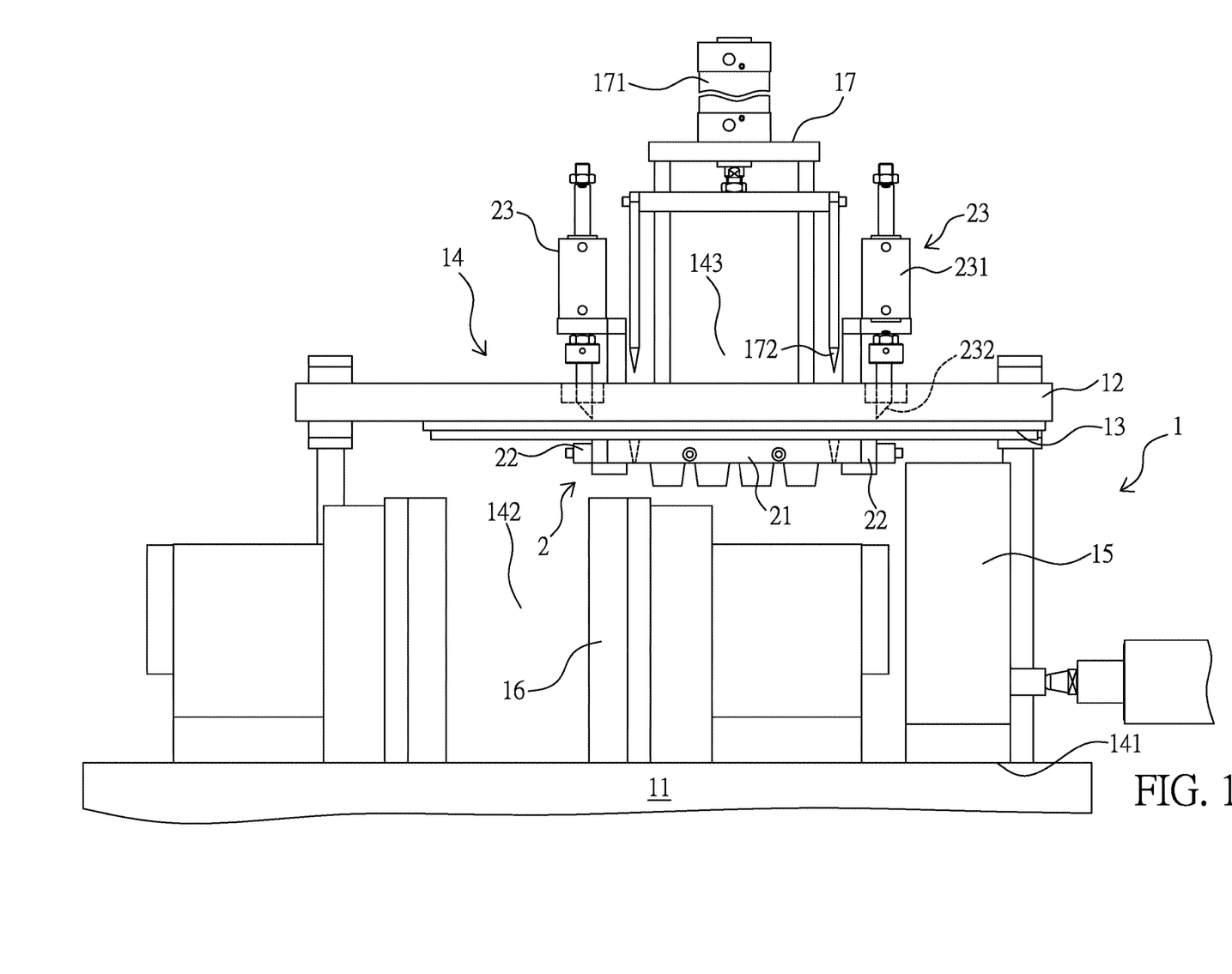
FIG. 1 is a front view illustrating the rapid mold replacing device being disposed on the molding machine according to the present invention.

Please refer to FIG. 1, the present invention discloses a rapid mold replacing device 2 disposed on an elevation seat 12 arranged above a machine table 11 of a molding machine 1, for example a vertical injection molding machine. A rotary plate 13 capable of being synchronously elevated with the elevation seat 12 is disposed at a bottom end of the elevation seat 12. As such, there are at least three operating zones 14 defined on the machine table 11 and the elevation seat 12, the operating zones 14 include an injecting zone 141 arranged on the machine table 11 and allowing an injection mold 15 to be disposed, a bottle blowing zone 142 allowing a bottle blowing mold 16 to be disposed, and a pushing zone 143 arranged on the elevation seat 12 and allowing a pushing mechanism 17 to be disposed.

When the molding machine 1 is a vertical injection molding machine, there are two operating zones 14 defined on the machine table 11 and the elevation seat 12, the operating zones 14 includes the injecting zone 141 arranged on the machine table 11 and allowing the injection mold 15 to be disposed, and the pushing zone 143 arranged on the elevation seat 12 and allowing the pushing mechanism 17 to be disposed.

Please refer from FIG. 2 to FIG. 5, the rapid mold replacing device 2 includes a mold, for example a bottle preform holding mold 21, arranged corresponding to each of the operating zones 14, a pair of fastening members 22a allowing the bottle preform holding mold 21 to be crossly arranged and fastened and disposed on a bottom surface of the rotary plate 13, and a unlocking mechanism 23, arranged corresponding to one of the operating zones 14, for example the pushing zone 143, and disposed on a top surface of the elevation seat 12.

The bottle preform holding mold 21 has a first half mold 211 and a second half mold 212, at least one connection rod 213 horizontally penetrating a stepped penetrating hole 211a, 212a correspondingly formed in the first half mold 211 and the second half mold 212, a retractable spring 214 respectively disposed at two sides of the connection rod 213 and sleeved in each of the penetrating holes 211a, 212a, a sealing member 215, for example a screw nut, respectively disposed at two ends thereof, and a pair of top connecting slots 216 formed at two sides of the bottle preform holding mold 21, vertically arranged and spaced with an interval, formed through the first half mold 211 and the second half mold 212 being engaged and formed in an inwardly inclined status. The pushing mechanism 17 has a second retractable driving device 171, the second retractable driving device 171, for example a pneumatic cylinder, is able to synchronously drive two pushing blades 172, which are arranged corresponding to the pair of top connecting slots 216, to pass the elevation seat 12 and the rotary plate 13 for performing an elevating operation.

As such, when the pairs of the pushing blades 172 respectively enter each of the corresponding top connecting slots 216, the first half mold 211 and the second half mold 212, which are symmetrically arranged, can compress the corresponding retractable springs 214, thereby forming an outwardly stretching status, and each bottle member, which has been processed with an bottle blowing operating, can be released from the pushing zone 143. Then, the pair of pushing blades 172 are retracted and recovered to original positions through the second retractable driving device 171 being operated again. The whole structure and the horizontal opening and closing operation of the bottle preform holding mold 21 are known as prior arts, therefore no further illustration is provided.

The characteristics of the bottle preform holding mold 21 comparing to the prior art are lateral walls defined at two ends of the bottle preform holding mold 21 are disposed with a pair of bolt slots 217 and formed through the first half mold 211 and the second half mold 212 being engaged.

Bottom ends of the pair of fastening members 22 locked on a bottom surface of the rotary plate 13 are inwardly protruded with a pair of supporting sheets 221 arranged to face each other and allowing two sides of the bottle preform holding mold 21 to be crossly arranged and positioned, and each of the fastening members 22 is horizontally formed with a through slot 222 at a location towards the corresponding bolt slot 217; a locking member 223 is disposed at an outer side of each of the fastening members 22, each of the locking members 223 is protruded with a locking bolt 224 arranged towards the corresponding through slot 222 and passing the through slot 222 and locked and bolted with the bolt slot 217, and a top surface of each of the locking members 223 has an unlocking slot 225 formed in an inwardly inclined status.

Moreover, each of the locking members 223 has an elastic displacing mechanism 226 arranged towards the corresponding fastening member 22, the elastic displacing mechanism 226 has a stepped seat hole 226a horizontally formed and adjacent to at least one side of the locking member 223 of each of the fastening members 22, and a pair of fixing members 226c, for example a screw bolt, each passing through an elastic member 226b disposed in one of the stepped seat hole 226a to be fixed with one of the fastening member 22, so that each of the locking members 223 is able to horizontally displace at the outer side of the corresponding fastening member 22 through an elastic effect provided by the elastic displacing mechanism 226, and the locking bolt 224 can be inserted or released from the bolt slot 217 of the corresponding bottle preform holding mold 21, thereby forming a locked fastening or an unlocked releasing effect to the bottle preform holding mold 21.

Figure 2:
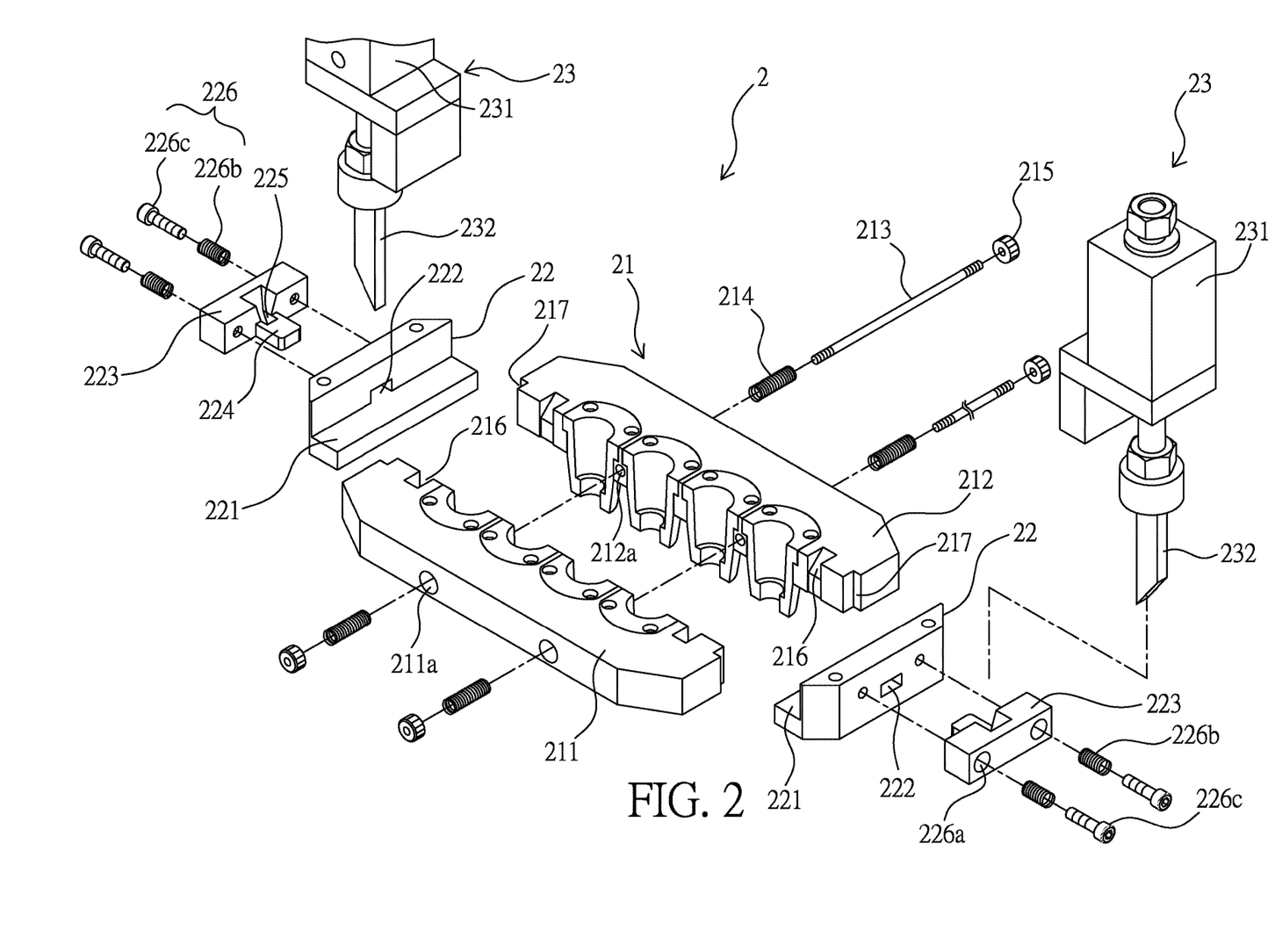
FIG. 2 is a perspective exploded view illustrating the rapid mold replacing device according to the present invention.
Figure 3:
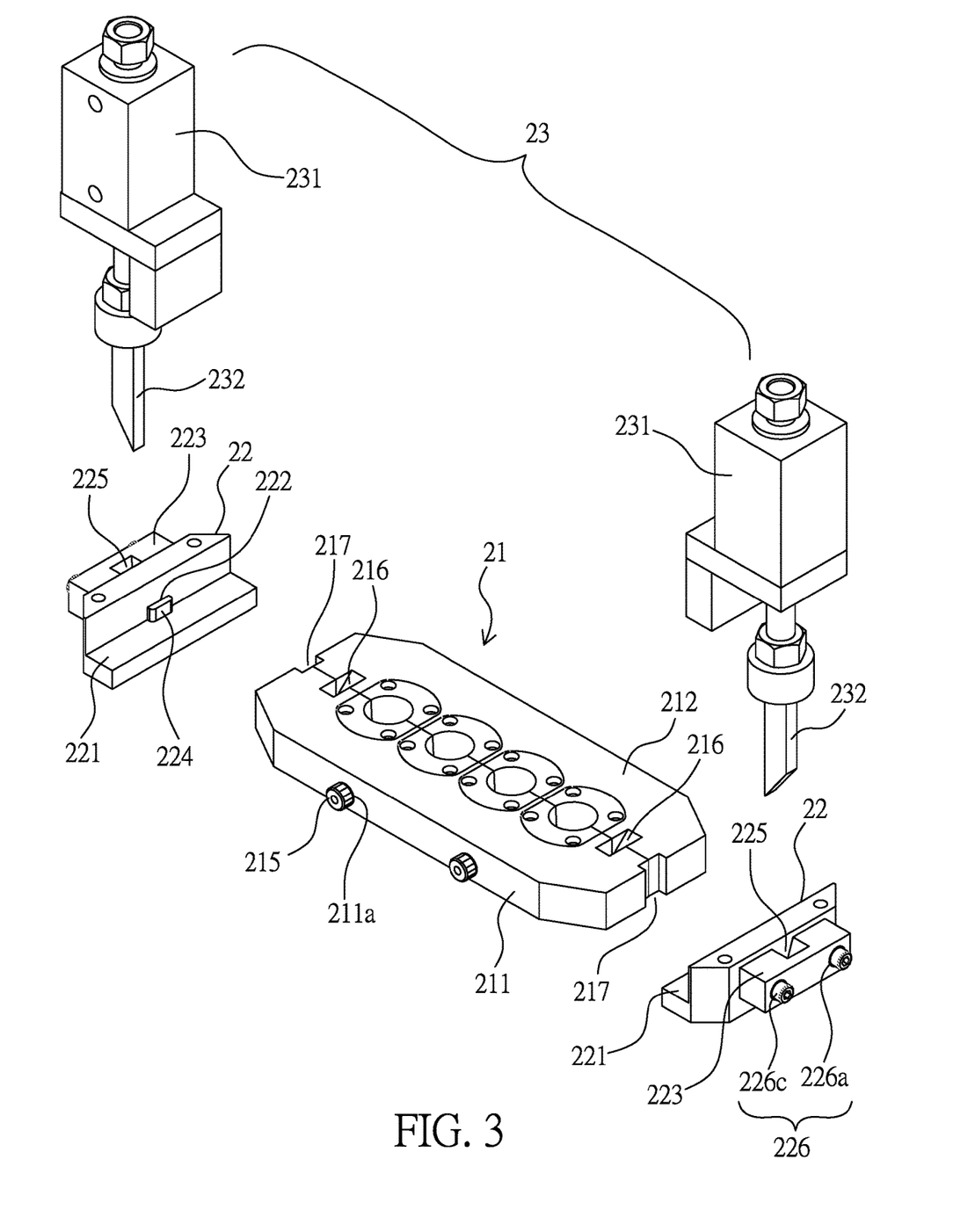
FIG. 3 is a perspective exploded view illustrating the fastening member and the retractable spring after the bottle preform holding mold being engaged according to the present invention.
Figure 4:
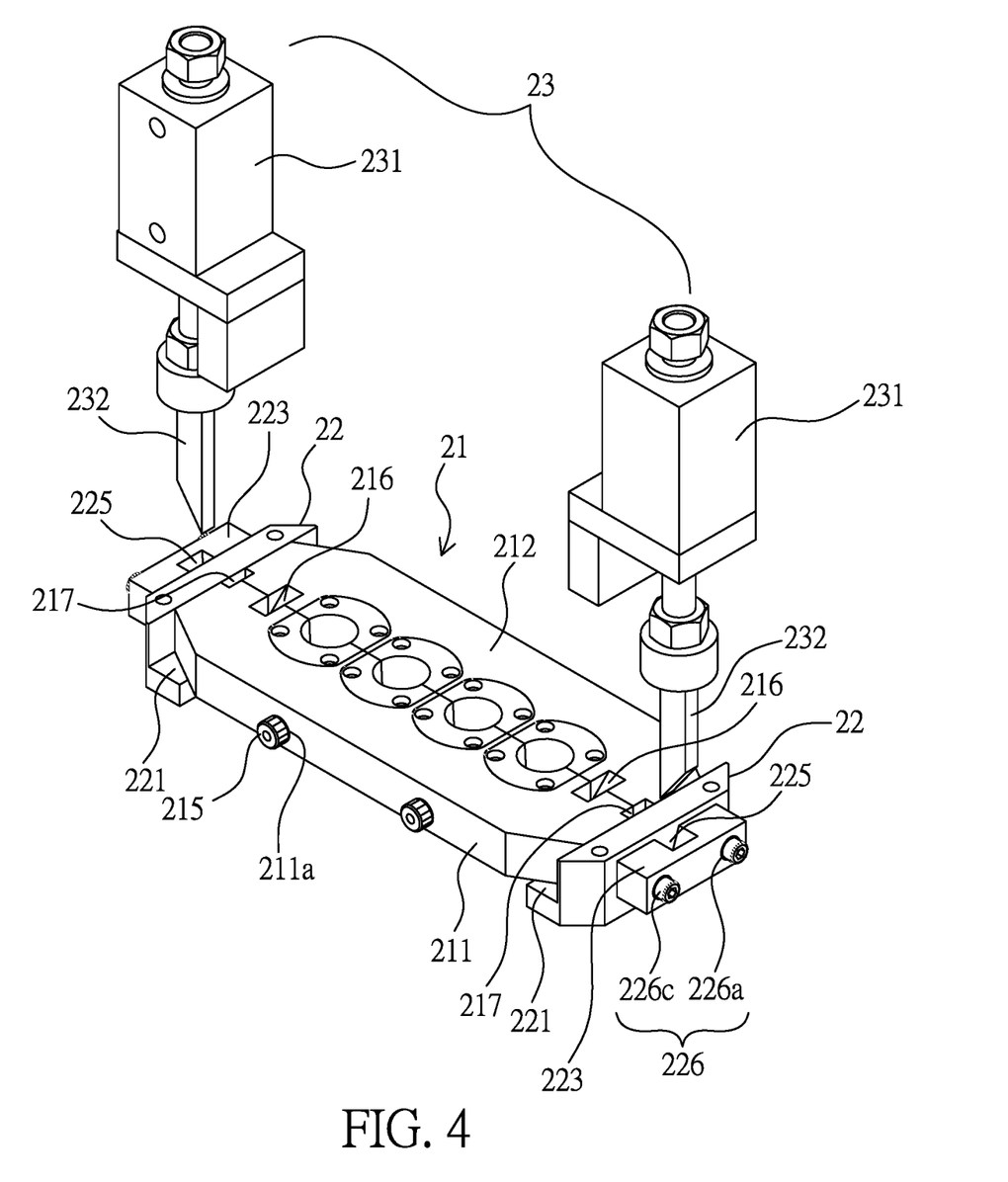
FIG. 4 is a perspective view illustrating the rapid mold replacing device of FIG. 3 being assembled and formed in the locked status.

The unlocking mechanism 23 is disposed on the top surface of the elevation seat 12, and preferably to be arranged at the pushing zone 143. The unlocking mechanism 23 has at least one first retractable driving device 231; as shown in FIG. 2, the first retractable driving device 231 is for example a pair of pneumatic cylinders, and the pair of first retractable driving devices 231 are able to synchronously drive a pair of unlocking blades 232, arranged corresponding to the pair of unlocking slots 225, to pass the elevation seat 12 and the rotary plate 13, thereby allowing the pair of unlocking blades 232 to be provided with an elevating function.

According to another embodiment, there is only one first retractable driving device 231, and a conventional T-shaped connection rod (not shown in figures) is connected to the first retractable driving device 231 and the pair of unlocking blades 232.

Figure 5:
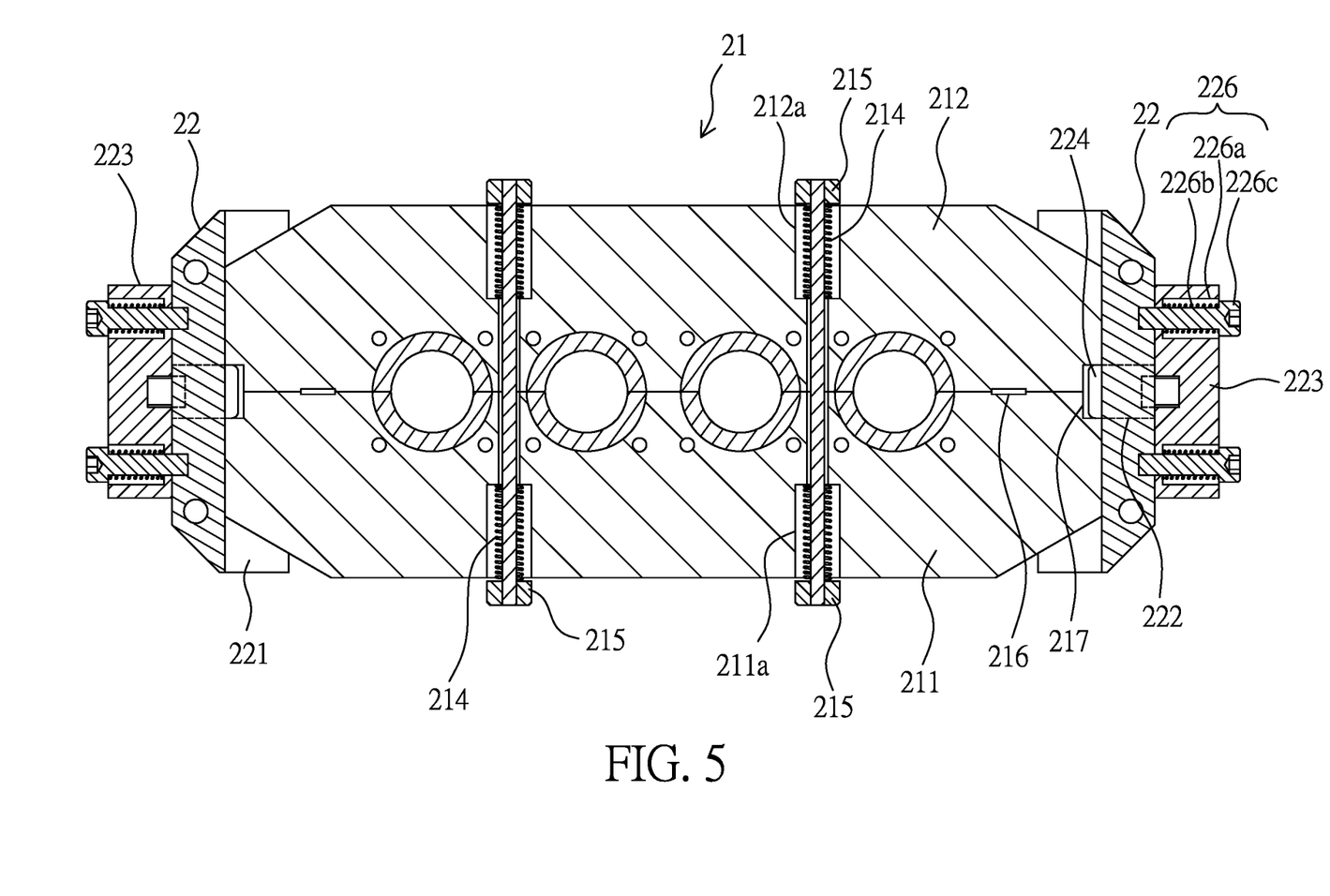
FIG. 5 is a cross sectional view illustrating the rapid mold replacing device of FIG. 3 being formed in the locked status.
Figure 6:
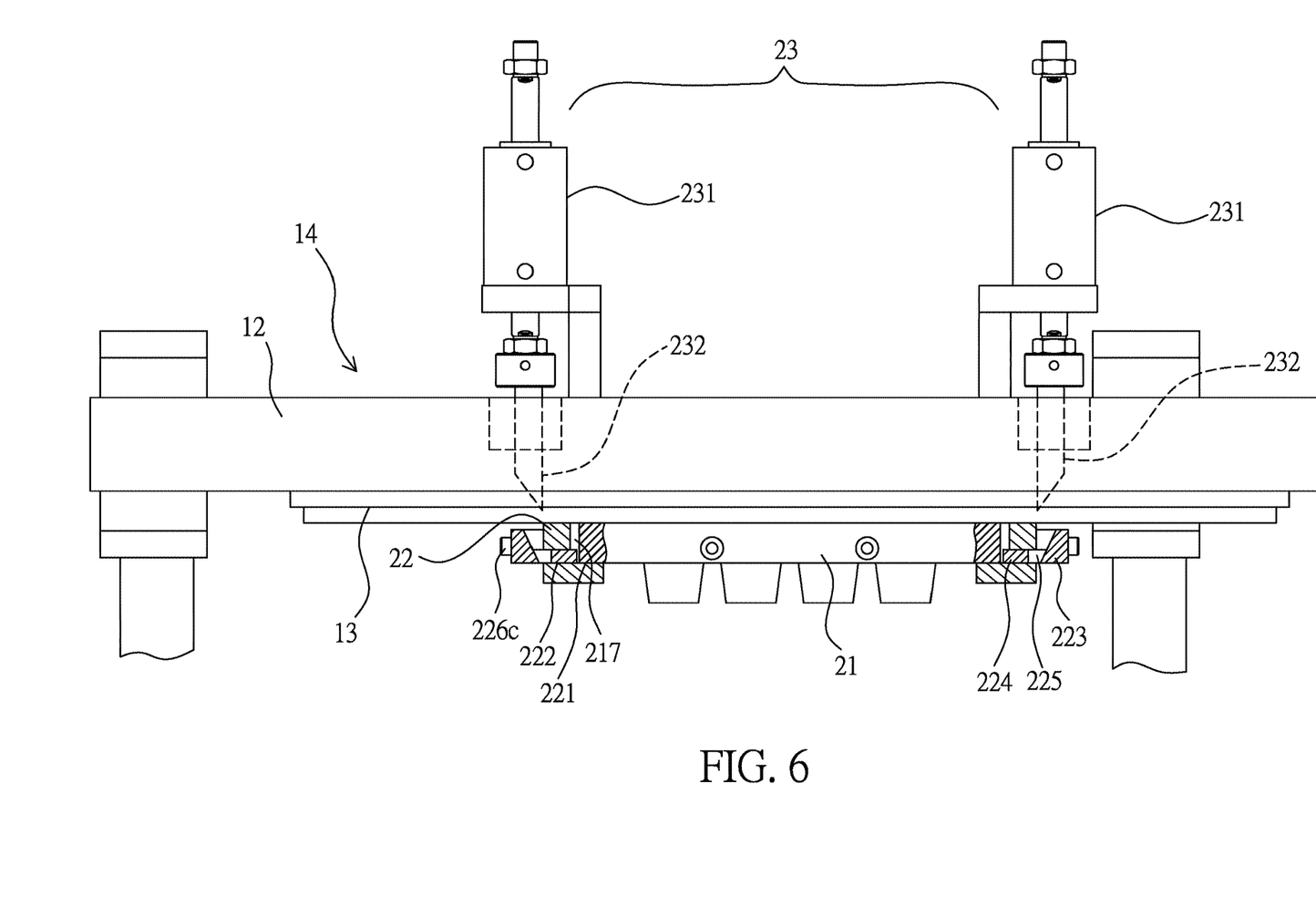
FIG. 6 is a partially enlarged cross sectional view illustrating the rapid mold replacing device wherein the bottle preform holding mold being in the locked status.

Please refer to FIG. 5 and FIG. 6, which are partially enlarged cross sectional views illustrating the rapid mold replacing device; as shown in figures, the pair of supporting sheets 221 facing each other and protruded from the pair of fastening members 22 locked on the rotary plate 13 allow the two sides of the bottle preform holding mold 21 to be crossly arranged and positioned, and the locking bolt 224 of the locking member 223 at the outer side of each of the fastening members 22 is allowed to pass the through slot 222 and inserted in each of the corresponding bolt slots 217 at the two ends of the bottle preform holding mold 21, thus the bottle preform holding mold 21 is formed in a locked status.

Figure 7:
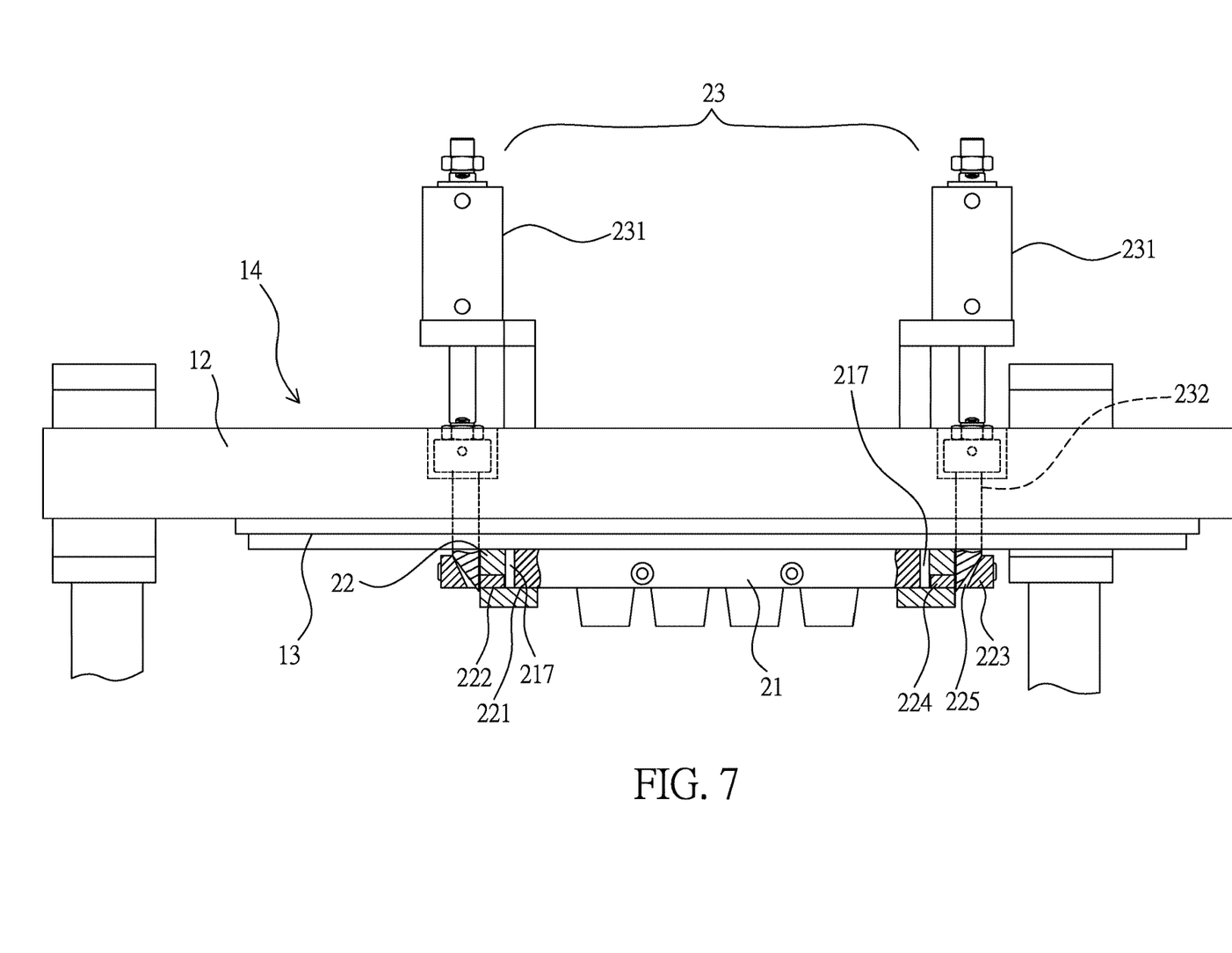
FIG. 7 is a partially enlarged cross sectional view illustrating the rapid mold replacing device wherein the bottle preform holding mold being in the unlocked status.

Please refer to FIG. 7, when a bottle preform holding mold having a different diameter is desired to be used for replacement, the unlocking mechanism 23 is operated by an operator for allowing the at least one first retractable driving device 231, disposed on the top surface of the elevation seat 12, to drive the pair of unlocking blades 232 to be synchronously and vertically descended to pass the elevation seat 12 and the rotary plate 13 so as to be inserted in the pair of unlocking slots 225, so that each of the elastic members 226b in the elastic displacing mechanism 226 is compressed, and the pair of the locking members 223 and the corresponding locking bolt 224 are outwardly displaced for being released from the pair of bolt slots 217 at the two ends of the bottle preform holding mold 21, thus the bottle preform holding mold 21 is formed in an unlocked status.

At this moment, the old bottle preform holding mold 21 can be removed from the pair of fastening members 22, and the new bottle preform holding mold 21 is disposed between the pair of supporting sheets 221 and the rotary plate 13, the unlocking mechanism 23 is operated for allowing the at least one first retractable driving device 231 to drive the pair of unlocking blades 232 to be synchronously and vertically ascended so as to be released from the pair of unlocking slots 225. Accordingly, each of the elastic members 226b in the elastic displacing mechanism 226 is able to be stretched for pushing the locking member 223 and the locking bolt 224 to be inwardly displaced, each of the locking bolts 224 is inserted in the corresponding blot slot 217 of the bottle preform holding mold 21, thus the bottle preform holding mold 21 is in the locked status as shown in FIG. 5 and FIG. 6.

Based on what has been disclosed above, advantages achieved by the present invention are as follows. The rapid mold replacing device is disposed at the operating zone, for example the pushing zone, so that the pair of fastening members are able to horizontally displace the loaded mold, for example the bottle preform holding mold, through the elasticity of the pair of locking members connected to the pair of fastening members, thereby forming the locking or unlocking operation, and there is no complicated connecting operation for a connecting member, for example a screw, required for being connected or disconnected, thereby providing a rapid mold replacing effect. Moreover, the rapid mold replacing device can be operated by single operator for performing the mold replacing operation, thereby providing an effect of saving labor and working time. Accordingly, the present invention is novel and more practical in use comparing to prior art.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A rapid mold replacing device for use in molding machine, disposed on a molding machine including a machine table, an elevation seat, and a rotary plate disposed at a bottom end of said elevation seat and capable of being synchronously elevated therewith, and at least two operating zones being defined on said machine table and said elevation seat; wherein, said rapid mold replacing device including: a mold, arranged corresponding to each of said operating zones, and having lateral walls defined at two ends thereof disposed with a pair of bolt slots; a pair of fastening members, disposed on a bottom surface of said rotary plate, protruded with a pair of supporting sheets allowing said mold to be crossly arranged and positioned; a locking member connected at an outer side of each said fastening member, and protruded with a locking bolt arranged towards one said bolt slot and passing one adjacent said fastening member, and a top surface of each said locking member additionally has an unlocking slot; and each said locking member has an elastic displacing mechanism arranged towards one said fastening member; and an unlocking mechanism, disposed on a top surface of said elevation seat and corresponding to one said operating zone, wherein said unlocking mechanism has at least one first retractable driving device, and a pair of unlocking blades, arranged correspondingly to a pair of said unlocking slots and capable of being synchronously driven by said at least one first retractable driving device to pass said elevation seat and said rotary plate; when said pair of unlocking blades are inserted in said pair of said unlocking slots, said pair of said locking members form a horizontal displacement at said outer side of said pair of fastening members through an elastic effect provided by said elastic displacing mechanism, so that each said locking bolt is released from one said bolt slot, thereby forming an unlocked status to said mold; when said pair of unlocking blades are released from said pair of unlocking slots, said pair of locking members form another horizontal displacement at said outer side of said pair of fastening members through said elastic effect provided by said elastic displacing mechanism, so that each said locking bolt is inserted in one said bolt slot, thereby forming a locked status to said mold.

2. The rapid mold replacing device for use in molding machine as claimed in claim 1, wherein said molding machine is a vertical injection bottle blowing machine, said operating zones include an injecting zone arranged on said machine table and allowing an injection mold to be disposed, a bottle blowing zone allowing a bottle blowing mold to be disposed, and a pushing zone arranged on said elevation seat and allowing a pushing mechanism to be disposed.

3. The rapid mold replacing device for use in molding machine as claimed in claim 1, wherein said molding machine is a vertical injection molding machine, said operating zones include an injecting zone arranged on said machine table and allowing an injection mold to be disposed, and a pushing zone arranged on said elevation seat and allowing a pushing mechanism to be disposed.

4. The rapid mold replacing device for use in molding machine as claimed in claim 2, wherein said unlocking mechanism is disposed at said pushing zone arranged on said top surface of said elevation seat.

5. The rapid mold replacing device for use in molding machine as claimed in claim 3, wherein said unlocking mechanism is disposed at said pushing zone arranged on said top surface of said elevation seat.

6. The rapid mold replacing device for use in molding machine as claimed in claim 1, wherein said mold is a bottle preform holding mold.

7. The rapid mold replacing device for use in molding machine as claimed in claim 6, wherein said bottle preform holding mold has a first half mold and a second half mold; at least one connection rod horizontally penetrating a stepped penetrating hole correspondingly formed in said first half mold and said second half mold, a retractable spring respectively disposed at two sides of each said connection rod and sleeved in each said stepped penetrating hole, a sealing member respectively disposed at two ends thereof; and a pair of top connecting slots formed at two sides of said bottle preform holding mold, vertically arranged and spaced with an interval, formed through said first half mold and said second half mold being engaged and formed in an inwardly inclined status, wherein said pair of bolt slots are disposed on lateral walls defined at two ends of said bottle preform holding mold and formed through said first half mold and said second half mold being engaged.

8. The rapid mold replacing device for use in molding machine as claimed in claim 1, wherein each said fastening member is horizontally formed with a through slot at a location allowing said locking bolt to pass.

9. The rapid mold replacing device for use in molding machine as claimed in claim 1, wherein said elastic displacing mechanism has a stepped seat hole horizontally formed and adjacent to at least one side of said locking member of each said fastening member, and a pair of fixing members each passing through an elastic member disposed in one said stepped seat hole to be fixed with one said fastening member.

* * * * *